May 9, 1967 J. T. BARTON 3,318,147
RATE OF FLOW INDICATOR FOR MORTAR
Filed Sept. 29, 1964
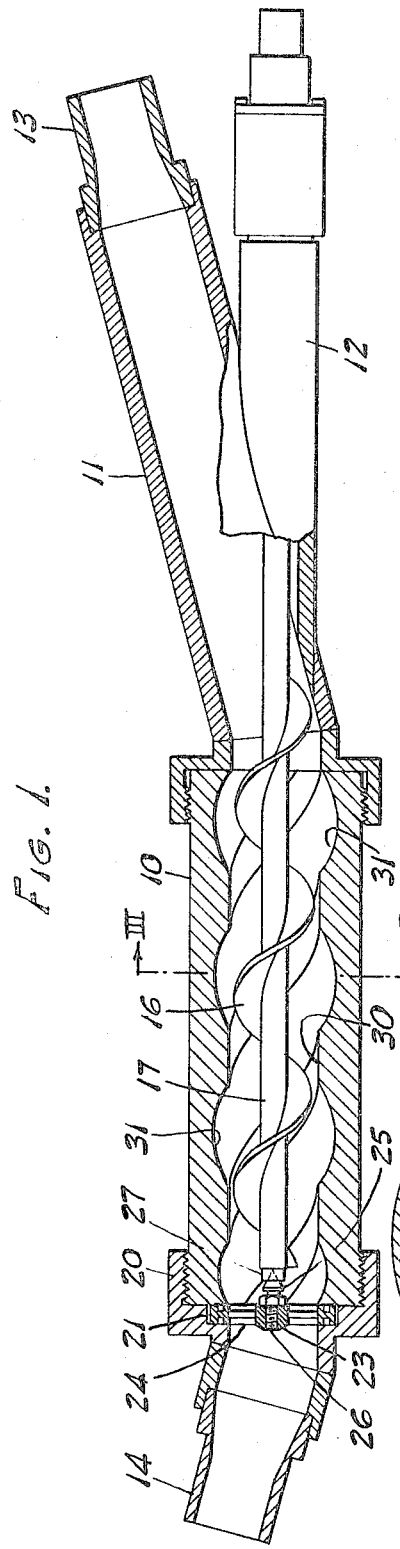
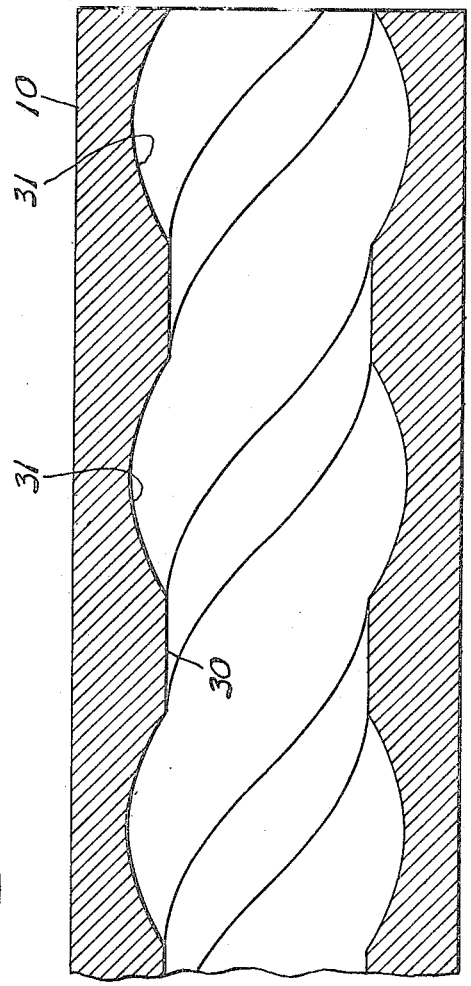
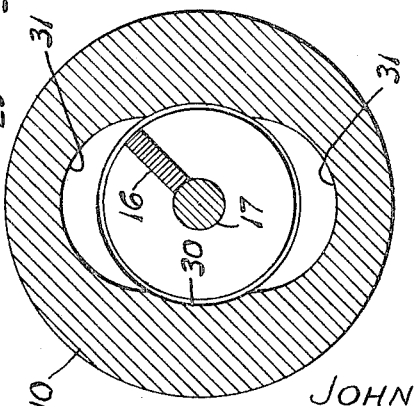
INVENTOR.
JOHN T. BARTON
BY
Chistel & Bean
ATTORNEYS

United States Patent Office 3,318,147
Patented May 9, 1967

3,318,147
RATE OF FLOW INDICATOR FOR MORTAR
John T. Barton, Montour Falls, N.Y., assignor to Perkins
Pipe Linings, Inc., Grand Island, N.Y.
Filed Sept. 29, 1964, Ser. No. 400,039
4 Claims. (Cl. 73—231)

This invention relates to apparatus for measuring the rate of flow of semi-fluid or plastic material through a conduit and more particularly to apparatus especially adapted to measuring the rate of flow of mortar being delivered through a pipe line.

While the apparatus of the present invention is susceptible of various uses, it is especially adapted to and aimed at the metering or flow-recording of mortar being delivered to subterranean pipe lining machinery. In a pipe lining machine the machine travels through the interior of a pipe at a variable or controllable speed and the thickness of the layer of mortar which it deposits on the interior of the pipe is dependent in large part on the relationship between the speed of travel of the machine and the rate of flow of mortar to the machine.

Accurate measurement of the rate of flow of mortar to the lining machine therefore becomes an important objective in or in conjunction with such machinery. The resultant measurement or indication can merely be observed and employed by an operator in making adjustments of the operations of other portions of the apparatus or automatic control relationships may be established as in United States Letters Patent No. 2,988,042, granted June 13, 1961 to Alfred J. Perkins.

The heavy, viscous nature of wet mortar renders metering or flow-measuring thereof very difficult and the highly abrasive character of the material further complicates the problem of providing a satisfactory metering instrument, both from the standpoint of accuracy of measurement and minimizing of wear and tear on the mechanism.

The present invention provides a mortar metering apparatus which is relatively accurate, considering the special nature of the material being measured and the unusual problems presented thereby. The metering apparatus of the present invention is of the general type shown and described in United States Letters Patent No. 3,119,263, granted Jan. 28, 1964 to Alfred J. Perkins. In the metering apparatus of that patent the mortar is passed through a tube or pipe containing a worm element and the mortar forced through such tube or pipe causes rotation of the worm element which rotation comprises the metering output of the apparatus, being connected to a recording instrument or to apparatus for controlling the operation of the pipe lining apparatus in various ways.

While the meter of Patent No. 3,119,263 operates in a satisfactory manner under normal conditions, it has been found that at certain times when the worm shaft, the recording or controlling mechanism driven thereby, or the drive between the worm shaft and the recording or controlling mechanism offer unusually high resistance to rotation of the worm shaft, the mortar tends to force its way through the metering tube in a helical path which follows the helical groove of the worm formation without rotating the worm or in such manner that rotation of the worm is at a less rate than it should be to give a correct metering indication.

When the metering tube in which the worm shaft rotates is relatively smooth, the tendency of the mortar to pass along the convolutions of the worm without rotating the same is aggravated. I have found, contrary to what might be expected, that a much more regular, consistent and accurate metering indication is obtained by avoiding the sliding effect of this relatively smooth plain interior cylindrical surface.

I have found that by providing a channel or channels along the interior surface of the tube in which the metering worm rotates, which channels extend counter to or at least to some extent transverse to the helical channel in the metering worm, the tendency of mortar to flow through the metering tube without rotating the worm is substantially eliminated. This unexpected result is achieved despite the fact that it would seem that the smoother and more frictionless the interior surfaces of the meter, the more accurate the metering result.

While the reason for the superior results achieved in the meter of the present invention is somewhat obscure, it appears that the resistance introduced by the mortar in the channels in the interior wall of the metering tube militate against flow of the mortar in a helical path without rotating the worm element. In effect, a shearing action takes place between the mortar in the convolutions of the worm element and the mortar in the channels of the metering tube which is believed to tend to cause the mortar in the worm convolutions to take the shortest path through the metering tube, namely a straight line in an axial direction, thus causing full rotation of the metering worm.

In the form of the present invention illustrated and described herein by way of example, the channel in the interior wall of the metering tube extends in a helical direction which is reverse to the helical channel in the rotatable metering worm. While excellent metering results are achieved in this manner, the channel or channels in the wall of the metering tube may extend otherwise, just so it does not extend coincidently with the convolution of the metering worm. For instance, channels may be provided in the interior wall of the metering tube which extend in a straight axial direction through the tube.

Various other objects and advantages of the apparatus of the present invention will appear to those skilled in the art form a consideration of the following specification and the accompanying drawing wherein an exemplary embodiment of the principles of the invention is described and illustrated. However, it is to be understood that such embodiments are by way of example only and that the principles of the invention may be variously applied and embodied and the scope of the invention is not limited otherwise than as defined in the appended claims.

In the drawing:

FIG. 1 is a general longitudinal cross-sectional view of one form of the mortar meter of the present invention;

FIG. 2 is a similar longitudinal cross-sectional view on a substantially enlarged scale of the metering tube portion of the mortar meter of FIG. 1 with the metering worm or screw removed; and FIG. 3 is a cross-sectional view on the line III—III of FIG. 1.

Like characters of reference denote like parts and, referring particularly to FIG. 1, the numerals 10 and 11 designate a pair of pipe sections which are rigidly connected in end to end relation to form a flow chamber which comprises the general body structure of the apparatus. The sections 10 and 11 extend at a slight angle with respect to each other and section 11 includes a bearing sleeve 12 which may be welded or otherwise rigidly joined therewith and which is so disposed that it forms a coaxial extension of body section 10.

The right-hand end of body section 11, as viewed in FIG. 1, is provided with a fitting 13 for connection with a mortar supply conduit and the left-hand end of body section 10 is provided with a fitting 14 for connection with an outlet conduit which, in the instance illustrated herein by way of example, may lead to a subterranean pipe lining machine. Thus the mortar flows through the body sections from right to left as viewed in the drawing and in the course of such flow acts against a blade formation 16 which extends helically about a supporting shaft 17 with which it may be integrally formed.

The provision of freely rotatable support means for screw shaft 17 and the provision of a construction wherein the leakage problem in connection with the shaft mounting is adequately dealt with comprises the subject matter of Patent No. 3,119,263, mentioned above. The internal construction of bearing sleeve 12 may be substantially as shown in that patent and the rotations of shaft 17 may be transmitted outwardly from the mortar chamber through bearing sleeve 12 and to suitable recording and/or control instrumentalities in a similar manner.

Shaft 17 is rotatably supported at its left end, as viewed in FIG. 1, directly within the mortar conduit portion of the flow measuring apparatus. At the outlet end of pipe section 10 an internally threaded cap 20 carries outlet fitting 14 and an annular rim portion 21 of a bearing support member is clamped between the adjacent end of pipe section 10 and an internal ledge of cap 20 as clearly shown in FIG. 1.

A bearing supporting hub 23 is supported by rim member 21 by means of radiating spokes 24 which impose a minimum of obstruction or resistance to mortar flow and a conical bearing member 25 of Carboloy or similar material is fixed to the end of a screw 26 which supports bearing member 25 for axial adjustment. The left-hand end of shaft 17 is provided with a Carboloy end member 27 having a conical recess for bearing engagement with conical bearing member 25.

The novelty of the present mortar meter structure resides particularly in the internal formation of the tubular section 10 within which the screw shaft 17 with its helical blade formation 16 rotate under the impetus of mortar forced through the tubular member 10. In the form shown herein by way of example, the tubular member is provided with a cylindrical bore 30 which is slightly larger in diameter than the outside diameter of helical blade formation 16. The wall of cylindrical bore 30 has formed therein a pair of helically extending channel formations or grooves designated 31. It will be noted that the double helix defined by channel formations 31 occupy the major portion of the internal surface of bore 30.

It is to be noted particularly that the helical formations 31 extend oppositely to the helical blade formation 16, the latter being right hand and the former left hand. Thus the channel formed by blade formation 16 intersects the channels 31 at various points within the tube 10, such areas of intersection comprising a very substantial part of the internal area of tube 10. A similar condition of intersection, though less acute, may be attained by providing in place of the helical channels 31, axially extending channels formed in the internal bore of tubular member 10.

The manner in which the foregoing internally channeled tubular meter body construction provides a much more accurate and reliable meter reading than mortar meters of the prior art has been described earlier herein. It will be noted from FIG. 1 that the channel formations 31 taper off gradually at the discharge end of tubular member 10 to meet the mortar opening within the rim member 21.

What is claimed is:

1. Apparatus for measuring the flow of plastic mortar comprising a cylindrical flow tube through which the mortar passes, a screw member mounted coaxially in said flow tube for variable rotation by and in proportion to the flow of mortar through said tube, said tube having and internal bore only slightly larger than the outside diameter of said screw to defined therewith a cylindrical shear surface, said bore having generally longitudinal channel means formed in its internal peripheral surface and extending obliquely with respect to the direction of extent of the convolutions of said screw, means supplying mortar to said flow tube under pressure whereby mortar substantially fills said channel means and the convolutions of said screw so that the mortar in said channel and in said screw convolutions is subject to shear along said cylindrical shear surface to retard movement of mortar in said screw convolutions in an angular direction and thus tend to cause substantially all of the mortar passed by said apparatus to flow through said screw convolutions in an axial direction to rotate the screw in proportion to the rate of flow of mortar therethrough.

2. Apparatus according to claim 1 wherein said channel means occupies the major portion of the surface area of said internal bore.

3. Apparatus according to claim 1 wherein said channel means extends helically in an opposite direction with respect to the direction of the convolutions of said screw.

4. Apparatus according to claim 2 wherein said channel means extends helically in an opposite direction with respect to the direction of the convolutions of said screw.

References Cited by the Examiner
UNITED STATES PATENTS

| | | | |
|---|---|---|---|
| 935,129 | 9/1909 | Speed et al. | 73—231 |
| 2,146,827 | 2/1939 | Kruspi | 73—231 |
| 3,119,263 | 1/1964 | Perkins | 73—231 |

RICHARD C. QUEISSER, *Primary Examiner.*

E. D. GILHOOLY, *Assistant Examiner.*